US005404990A

United States Patent [19]

Barnes et al.

[11] Patent Number: 5,404,990

[45] Date of Patent: Apr. 11, 1995

[54] VANE TYPE ORIENTER

[75] Inventors: Derek Barnes, West Vancouver; Lorne E. Caddo, Pitt Meadows; Robert M. Knudson, Coquitlam; Roger W. Kozak, Port Coquitlam, all of Canada

[73] Assignee: MacMillan Bloedel Limited, Vancouver, Canada

[21] Appl. No.: 288,809

[22] Filed: Aug. 12, 1994

[51] Int. Cl.[6] .............................................. B65G 47/24

[52] U.S. Cl. ..................................... 198/382; 198/383

[58] Field of Search ............... 198/382, 383, 390, 392, 198/533, 387; 425/81.1, 82.1, 83.1, 110

[56] References Cited

U.S. PATENT DOCUMENTS

| | | | |
|---|---|---|---|
| 3,115,431 | 12/1963 | Stokes et al. . | |
| 3,807,931 | 4/1974 | Wood et al. . | |
| 4,058,201 | 11/1977 | Etzold | 198/382 |
| 4,380,285 | 4/1983 | Burkner | 198/533 |
| 4,494,919 | 1/1985 | Knudson et al. | 198/382 X |
| 4,623,058 | 11/1986 | Bossier | 198/382 |
| 4,666,029 | 5/1987 | Burkner | 198/382 |
| 4,836,388 | 6/1989 | Bielagus | 198/382 X |
| 5,325,954 | 7/1994 | Crittenden et al. | 198/382 |

FOREIGN PATENT DOCUMENTS 920529 2/1973 Canada .

*Primary Examiner*—James R. Bidwell

*Attorney, Agent, or Firm*—C. A. Rowley

[57] ABSTRACT

A vane typed orienter is formed by a plurality of spaced parallel shafts having radial extending axially spaced disks mounted thereon. Passages are formed between the disks and adjacent disks on adjacent shafts define sides of such passages. A vane element is provided to complete the wall formed by a pair of adjacent disks forming one wall of a passage and at least substantially fills the lower gap formed between the peripheries of the adjacent disks forming the one wall.

20 Claims, 3 Drawing Sheets

VANE TYPE ORIENTER

FIELD OF INVENTION

The present invention relates to an orienter, more particularly, the present invention relates to a combination disks conveying type orienter.

BACKGROUND OF THE INVENTION

Different types of disk type orienters have been used. One such device is shown in U.S. Pat. No. 3,115,431 issued Dec. 24, 1963, to Stokes et al. This device includes the plurality of intermeshed rotating disks mounted on a plurality of substantially parallel side-by-side shafts positioned in a plane. The disks on the shafts are uniformly positioned intermediate disks on their adjacent shafts. In the arrangement described, the disks on adjacent shafts turn in the same direction, except for the last disks in the sequence which turn in the opposite direction. This type of arrangement (hereinbelow referred to as the Stoke's arrangement) has been found satisfactory particularly for use with long strands. The disclosure of the Stokes et al. patent is incorporated herein by reference.

Another similar device is shown in the Burkner U.S. Pat. No. 4,666,029 issued May 19, 1987 but wherein the disks on adjacent shafts are arranged in pairs in side by side relationship with the disks forming one of the pairs defining one side of an orienting passage and the disks forming the next axially space pair defining the other side of the passage. This arrangement (hereinafter referred to as Burkner's arrangement) is also satisfactory but the Stokes' arrangement is less complicated and appears to be about as effective in aligning the strands as the Burkner arrangement. The Burkner et al. patent is incorporated herein by reference.

U.S. Pat. Nos. 4,380,285 issued Apr. 19, 1983 to Burkner and 4,623,058 issued in Nov. 18, 1986 to Bossier each shows a combination of disks mounted on spaced parallel shafts and positioned above and intermediate stationary substantially vertical guide walls forming opposite walls of orienting passages through which the strands fall and are oriented. This type of orienter also has not been found to be particularly satisfactory for producing an end product with the required orientation and strength.

Canadian patent 920,529 issued Feb. 6, 1973 to Turner et al. shows yet another form of orienter wherein partition walls are designed to move to prevent plugging.

U.S. Pat. No. 3,807,931 issued Apr. 30, 1974 to Wood et al. describes another form of orienter which uses a number of vertically stacked decks each formed by stationary vertical fins each provided with a vibrating cap that improve movement of the wood particle there between. Each deck has a number of fins that is a multiple of the number of fins in the deck immediately above it so that the fins on the upper deck directly overlie corresponding fins on the lower deck and the flow of strands is divided by the upper deck and the divisions so formed further subdivide by the next lower deck. In this device, the spacing between the fins on the top deck is about half the average length the strands that are to be oriented and the spacing between the upper and lower deck is defined as the distance greater than the average length of the strands. The orienting system of this patent clearly would not be effective for long wafers nor would it function well for conventional length (3 to 4 inch) strands.

U.S. Patent 4,494,919 issued Jan. 22, 1985 to Knudson et al. describes another form of apparatus for orienting strands particularly suited to orienting and distributing of long strands.

It is also known to use pre-orienters as described in Crittenden's et al. U.S. Pat. No. 5,325,954, wherein two orienting decks are stacked one on top of the other with the axial spacing between the disks on the uppermost deck, significantly wider spaced than the disks on deck therebetween.

In a concurrently filed co-pending application by Barnes titled Short Strand Orienter, the concept of specific axial spacing or passage walls to size (width) and position the passages in one deck relative to those in the deck immediately thereabove is described and it is shown that significantly improved results are obtained with an arrangement wherein the passages through an upper deck are bisected into two passages by the next lower deck.

The vertical spacing between the bottom of the orienter and the top of the mat or layup being formed is very important i.e. the distance the strand are free to fall unrestrained laterally between the level where they are constrained by the walls of the orienting passages in the lowest deck of a multi-deck orienting system has also been found to be important for retaining the orientation applied to the strands in the orienter. When disks are used, the gaps between the lower peripheries of adjacent disks forming the same wall of one of the orienting passages, further contributes to the vertical spacing and loss of orientation since it raises the bottom edge of the passage significantly above the bottom edge of the lowermost point on the peripheries of the disks. This is a problem when vanes are used as the walls of the orienting passages.

Disks were initially used in orienters to reduce plugging and to separate strands of different length so that the resultant consolidated composite product had different strength characteristics due to the positioning of the strands of different length through the thickness of the product. Positioning the longer wafers near the surface improves the bending strength of a panel product.

The use of vanes significantly reduces throughput compared with the use of rotating disks as the walls of the orienting passages. Similarly, the throughput using a single orienting deck with a narrow gap to get good orientation even when rotating disks are used as the walls of the orienting passages, has been found to be relatively low and it is necessary to make the orienter longer and to open up the gap between the rotating disks to increase throughput.

BRIEF DESCRIPTION OF THE PRESENT INVENTION

It is an object of the present invention to provide an orienter capable of orienting wood strands or the like to improve their orientation relative to that obtainable using a conventional disk type orienter.

Broadly, the present invention relates to an orienter comprising a plurality of spaced parallel shafts, a plurality of axially spaced radial extending disks mounted on each of said shafts, said disks defining side walls of substantially vertically extending orienting passages, a plurality of said disks, each on different ones of said shafts defining a side wall of one of said substantially vertical orienting passages, vanes mean extending between a pair of adjacent of said disks forming the same said side wall of said passage and closing a gap formed between lower adjacent peripheries of said adjacent disks.

Preferably, each said vane will be in substantially the same vertical plane as its respective adjacent of said disks whose gap therebetween said vane is dosing.

Preferably, each of said disks will be provided with a circumferential groove extending around its periphery and said vane will be received within said groove to maintain said vane in alignment with said adjacent disks.

Preferably said groove will be formed between a pair of cooperating disk elements that are combined to form each one of said disks.

Preferably a bottom will be formed to said groove by an annular insert positioned between said disk element of each one of said disks.

Preferably, each of said disks will be provided with notches circumferentially spaced around its periphery and extending radially inward by selected distance and wherein a lower edge of said vane will extend below a plane containing said parallel shafts a distance less at least equal to the radius of the bottom of said groove and than the radius of said disks.

Preferably, all said disks will have essentially the same radius.

Preferably, said adjacent disks forming said one wall of each passage will be mounted on alternate shafts of said plurality of shafts and wherein disks on alternate shafts are mounted axially spaced midway between the disks on the shafts between said alternate shafts.

Preferably, wiper means will be provided on each said shaft in the position to project above an upper edge of its adjacent said vane to dear strands therefrom.

BRIEF DESCRIPTION OF THE DRAWINGS

Further feature, objects and advantages will be evident from the following detailed description of the preferred embodiments of the present invention taken in conjunction with the accompanying drawings in which.

DESCRIPTION OF THE PREFERRED EMBODIMENTS

Figure 1:
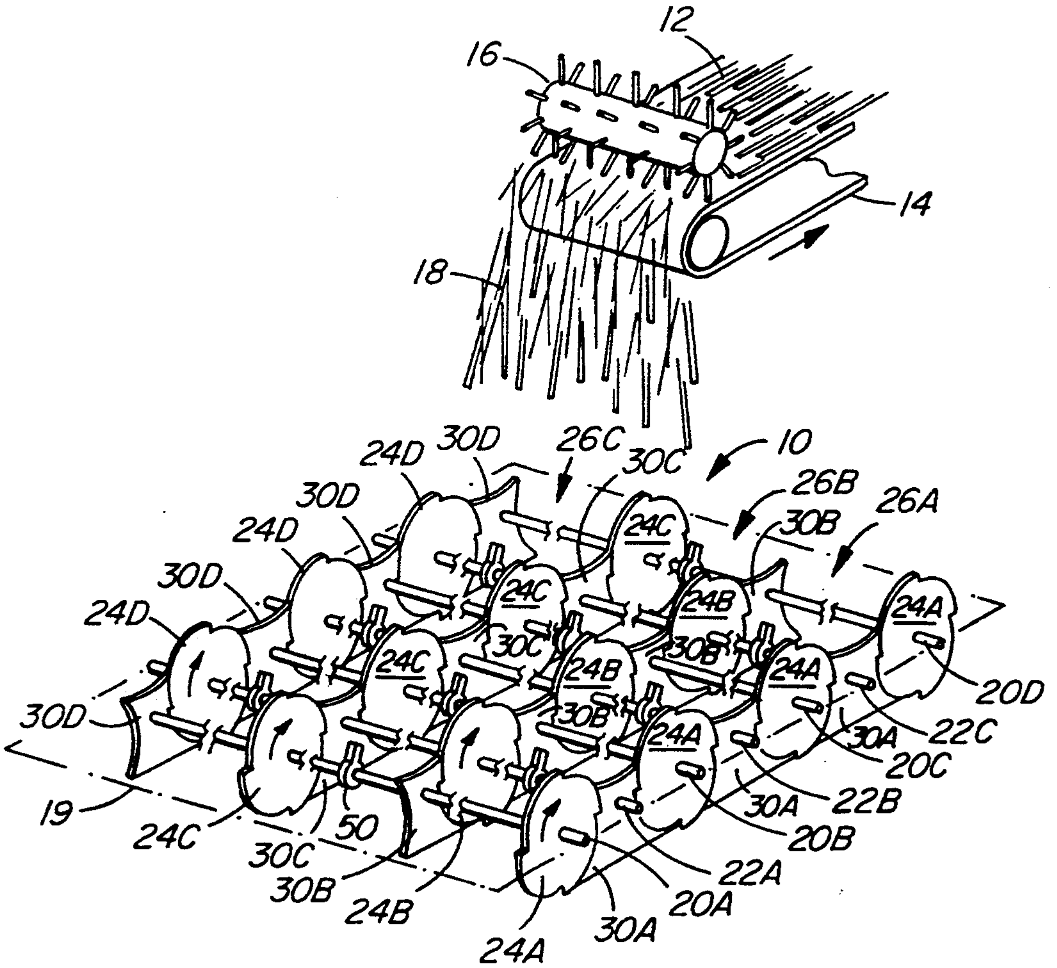
FIG. 1 is a schematic isometric exploded view illustrating a portion of an orienter constructed to incorporate vanes in accordance with the present invention but showing the disks more widely spaced so the concept will be more evident.

As shown in FIG. 1, the orienter 10 is provided with strands or the like 12 from an infeed conveyor 14 and a distributor roll 16 (preferably spiked) which distributes a stream 18 of wood strands over the upper end of the orienter 10.

The wood strands normally used with the orienter system of the present invention may have any reasonable length—generally, less than about 12 inches, a thickness less than about 0.25 inches, normally less than about 0.05 inches, a width generally about ½ inch and up to about 3 inches with a length to width aspect ratio of at least 2.

The orienter 10 in the illustrated arrangement formed by a plurality of alternate shafts and a plurality of intermediate shafts all arranged in a substantially the same plane and all extending substantially parallel to each other. Shafts have been numbered 20A, 20B, 20C and 20D commending the left side of the drawing and the shaft by the reference numerals 22A, 22B, 22C commencing with 22A adjacent to the left side of the drawing so that the intermediate shaft 22A is between the alternate shafts 20A and 20B, 22B between the shafts 20B and 20C and the shaft 22C between the shafts 20C and 20D. In FIG. 1, the axial spacing of the disks has been exaggerated to more clearly illustrate the invention.

The plane in which the shafts are retained is schematically indicated by the dash dot line 19.

The disks 24A on the alternate shafts 20A, 20B, 20C and 20D combine to form one wall of a vertical passage 26A. The letter A is used to designate those disks that rotate in a single plane substantially perpendicular to the plane 19 and define at major portion of one wall of the first (front in the drawing) vertical passage or orienting passage 26A.

In the illustrated arrangement, a second set of disks 24B are mounted on the intermediate shafts 22A, 22B and 22C. These disks 24B define a second wall of the passage 26A substantially parallel to the wall formed by the disks 24A and also form a wall of the next passage 26B, i.e. the second passage from the front of the drawing, the opposite side of which is defined by the disks 24C on the alternate shafts 20A, 20B, 20C and 20D and as described, these disks 24C combine to form a wall of the next vertical orienting passage 26C, the opposite side of which is defined by the disks 24D and so on across the width of the orienter 10.

It will be apparent that the walls on the opposite sides of the passages 26A, 26B and 26C are defined primarily by disks on adjacent shafts.

The disks on the intermediate shafts are axially spaced substantially midway between the disks on alternate shafts, i.e. the disks 24B are spaced midway between the disks 24A and 24C and the disks 24C are spaced midway between the disks 24B and 24D, etc.

The arrangement described is what has been defined above as the Stoke's arrangement i.e. uses the disk arrangement disclosed in the Stokes et al patent referred to above. It will be apparent that if a Burkner type arrangement is used, a similar structure could be formed.

It will be apparent that there is a gap G between the disk 24A on the various shafts 20A, 20B, 20C and 20D and between the disks 24C on the same shaft as well as between the disks 24B on the shafts 22A, 22B and 22C and the disks 24D on these same shafts, i.e. there is gap formed between adjacent disks defining a wall of the vertical orienting passages 26A, 26B, 26C, etc.

The gap G is filled by a vane or vane member 30 which completely closes off the gap G. In the illustrated arrangement, the vane member 30 positioned between adjacent disks such as the disks 24A on shafts 20A and 20B is mounted on a suitable bearing not shown on the shaft 22A and mates with the adjacent disk 24A as will be described below to substantially completely fill the gap G and extend for a distance above the shaft 22A on which it is supported.

Each of the vane members 30 has an upper surface or edge 32 that is preferably substantially concave and a substantially straight line bottom surface or edge 34 that is preferably substantially parallel to the plane 19 containing the axes of the shafts. If plugging tends to occur at the top of the vanes the concave surface may be replaced with a sloped surface sloping down in the direction of strand movement by the disks, however regardless of the shape of the upper edge 32 the edge must be positioned well below the upper periphery of the adjacent axially spaced disks.

Figure 2:
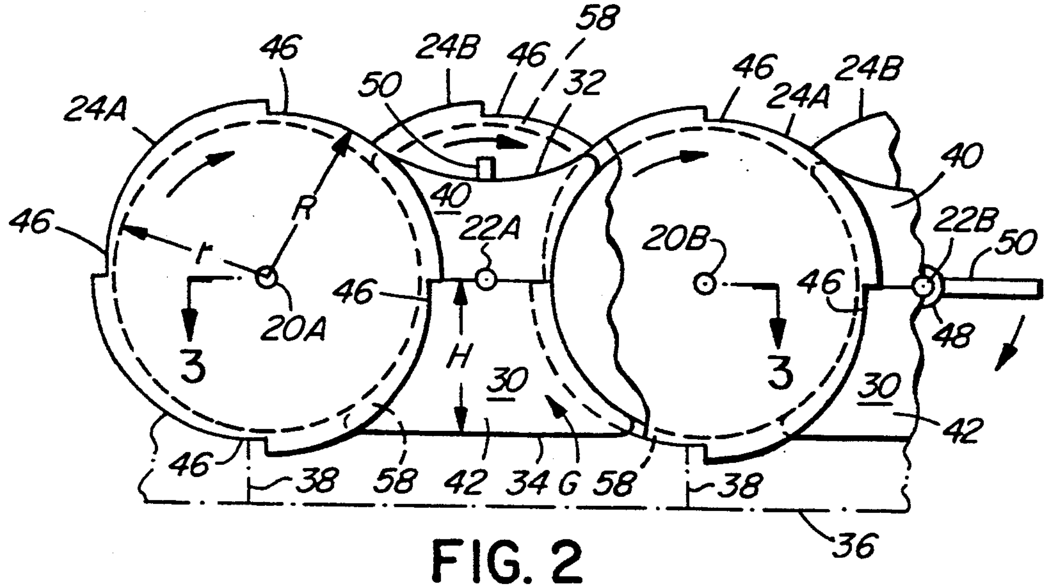
FIG. 2 is a side view of a small portion of the orienter showing the vanes in position and with a portion of one of the disks broken away.

In the arrangement illustrated in FIG. 2, the solid line arrangement utilizes discreet elements 30 positioned between each of the disks 24A and the bottom edge of the elements 30 project down to the position slightly higher than the lower most radial position of the disks 24A, i.e. the height H is preferably slightly less than (in the order of $\frac{1}{4}$ inch) the radius R of the disks 24A.

If desired, the vane 30 may extend well below the radius R as indicated by the dash lines 36. In the illustrated arrangement, the dash lines 38 indicate that each of the elements 30 are discreet elements joined together at the line 38. However, they may be made as a continuous element extending substantially the length of the orienter 10.

On the subject of mounting, it is preferred to divide the vane into an upper section 40 separate from a lower section 42 as indicated by the split line which intersects the shalt on which the vane 30 is mounted to facilitate removal or application of the vanes 30 by separation into the two parts.

The upper edge 32 of the vane is made substantially concave in the illustration but may be modified to reduce the possibility of lodging. In each of the disks 24 is provided with grooves or notches 46 to help to clear any strands that may be supported on the upper edges 32. Also, a wiper 48 is mounted on each of the shafts in a position adjacent to the vane 30 and is provided with a spike or the like 50 that also tends to clear the upper surface 32 and to ensure strands do not lodge in the passages over the shafts.

In the illustrations of FIGS. 1 and 2, the vanes 30 have been further identified by the reference letter A, B, C or D depending on which of the disks 24A, B, C or D it cooperates with to form a wall of a passage.

Figure 3:
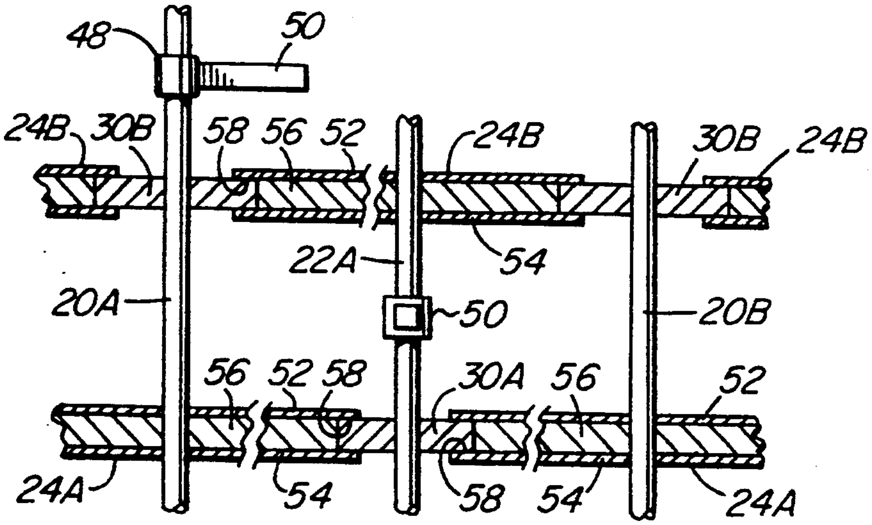
FIG. 3 is a section along the line 3—3 of FIG. 2.

As can be seen in FIG. 3, in the preferred construction each of the disks 24 is formed by a pair of relatively thin outer disks 52 and 54 and an inner disk or spacer 56 which spaces the outer disks 54 and defines the bottom of the circumferential groove 58 in each of the disks 24. The spacing between the adjacent faces of the disks 52 and 54 define the width of the circumferential groove 58 which is slightly wider than the thickness of the vanes 30 to accommodate the vanes therein. The depth of the grooves 58 will normally be in the order of about at least $\frac{1}{2}$ inch and not exceed about $1\frac{1}{2}$ inches, i.e. the radius R is $\frac{3}{4}$ to $1\frac{1}{2}$ inches less than the radius r (see FIG. 2). The depth of the groove 58 is set so that it retains the vane 30 in position but is not so deep as to provide a significant problem of strands penetrating the groove and becoming lodged therein.

The depth of the notches 46 distance between the outer periphery of the disk(s) 20 or 22 and the bottom of the notches 46 will generally be no greater than the difference between R-r.

In operation, it will be apparent that all of the disks or shafts are driven preferably in the same direction as indicated by the arrow in FIG. 2 and the wipers 48 are connected to the respective shafts to rotate there with the height of the edge 34 permits the formation of a relatively uniform distance between the bottom of the orienter and the top 80 of the mat 82 being formed (see FIG. 4) which improves significantly, the resulting orientation of the strands passing there through i.e the added height of the gap G is essentially eliminated.

Figure 4:
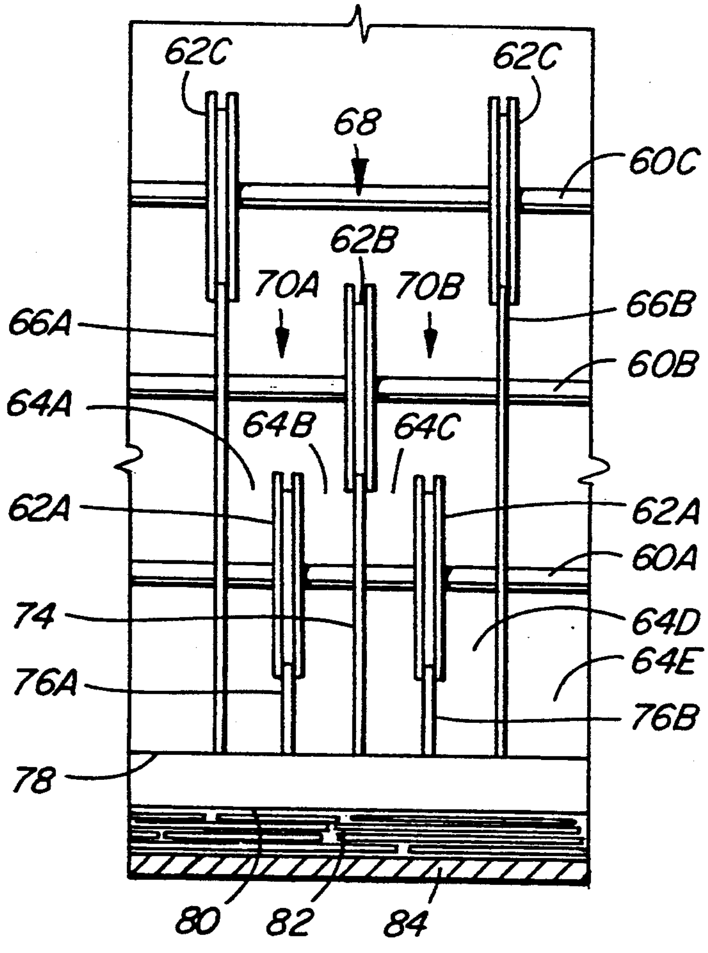
FIG. 4 is a schematic illustration of a multi-level orienter constructed incorporating the present invention.

FIG. 4 shows a modification of the present invention wherein an orienter similar to the orienter described in Applicant's co-pending application, Short Strand Orienter wherein a plurality of decks are provided one above the other. In this arrangement, the bottom shafts are indicated at 60A and form in effect a bottom deck, the intermediate shafts at 60B which form an intermediate deck and the upper shafts at 60C which form the top deck. Each of these shafts 60A, B and C represent a plurality of shafts 20A, 20B, 20C, 20D, 22A, 22B, 22C, etc. defining an orienter at each level. The disks 62A and the shafts 60A are set relatively close together and define the width of the bottom orienting passages indicated at 64A, B, C and D which define the passages of width sufficient to obtain the required degree of orientation of the strands. The passages 64A, B in effect bisect the passages formed between the disks 62B on the shaft 60B i.e. passage 70A or 70B and which in turn bisect the passage(s) 68 formed between the disks 62C on the shafts 60C.

Suspended below each of the disks 62C is a relatively long vane 66 (designated as 66A and 66B) in FIG. 4 which define a relatively wide passage 68. This wide passage is as above described divided into a pair of preferably equal width passages 70A and 70B by the disk 62B and its vane 74 extending therebelow.

As above indicated, the passages 70A are bisected by the disks 62A into the passages 64A, 64B, 64C and 64D. The vanes 76A and B extend downwardly from the disks 62A with the bottom edges of all of the vanes 66A, 66B, 74, 76A and 76B, all being positioned in substantially the same plane 78 which is substantially parallel to the top 80 of the mat 82 being formed on the belt or the like collective means 84 ie the distance between the top of the conveyor 84 and the edges or plane 78 is substantially uniform.

The above described embodiments shown in FIG. 4 permits the formation of an orienter wherein throughput is improved as described in the said application.

In the embodiment shown in FIG. 4, the wipers 48 with spikes 50 have not been shown but they will be provided as required to ensure that the upper edges of the various vanes and of the shafts are kept clear and plugging is substantially avoided.

EXAMPLE

Using a single deck or plurality of decks positioned one above the other and wherein each deck was made as in Stoke's arrangement using 16 inch diameter disks on 2 inch diameter shafts. The disk spacing through the bottom disk in all cases was $1\frac{1}{2}$ inch (passage width). A 6 inch strand mixture was fed to the orienter and the orientation measured when operating using different numbers of decks.

Figure 5:
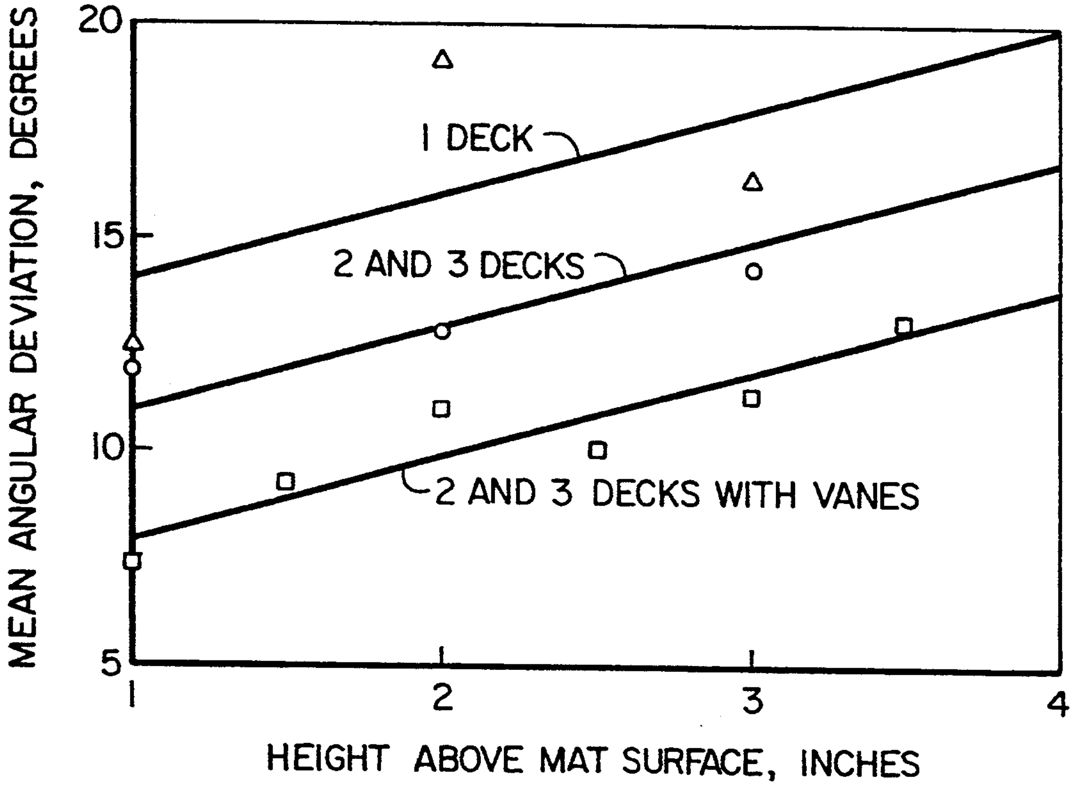
FIG. 5 is a graph of mean angular deviation versus height above the mat of the lower most part of the disks or vanes.

As shown in FIG. 5 with only one disk (bottom deck) the orientation attained was poorest and that with two decks wherein the bottom disk had vanes as defined herein the orientation was significantly better than with any number of decks were used.

It will be apparent that in all of the embodiments, the vanes are relatively thin, flat elements, i.e. planer elements and preferably are contained within the plane of the disks with which they cooperate.

In some cases, adhesive application to the strands may tend to accumulate and some means for removing this adhesive from the peripheral grooves in which the vanes are received may be added, e.g. scrapers, nonstick coatings, etc.

Having described the invention, modifications will be evident to those skilled in the art without departing from the scope of the invention as defined in the appended claims.

We claim:

1. An orienter comprising a plurality of spaced parallel shafts, a plurality of axially spaced radial extending disks mounted on each of said shafts, said disks defining side walls of substantially vertically extending orienting passages, a plurality of said disks, each on different ones of said shafts defining a side wall of one of said substantially vertical orienting passages, vanes means extending between a pair of adjacent of said disks forming the same said side wall of said passage and closing a gap formed between lower adjacent peripheries of said adjacent disks.

2. An orienter as defined in claim 1 wherein each said vane is in substantially the same vertical plane as its respective adjacent of said disks whose gap therebetween said vane is closing.

3. An orienter as defined in claim 2 wherein each of said disks is provided with a circumferential groove extending around its periphery and wherein side edges of said vane are received within said groove in its respective adjacent disks with which it cooperates to maintain said vane in alignment with said adjacent disks.

4. An orienter as defined in claim 3 wherein each said groove is formed between a pair of cooperating disk elements that are combined to form each one of said disks.

5. An orienter as defined in claim 4 wherein a bottom is formed in each said groove by an annular insert positioned between said disk elements of each one of said disks.

6. An orienter as defined in claim 1 wherein wiper means will be provided on each said shaft in a position to project above an upper edge of its adjacent said vane to clear strands therefrom.

7. An orienter as defined in claim 2 wherein wiper means will be provided on each said shaft in a position to project above an upper edge of its adjacent said vane to clear strands therefrom.

8. An orienter as defined in claim 3 wherein wiper means will be provided on each said shaft in a position to project above an upper edge of its adjacent said vane to clear strands therefrom.

9. An orienter as defined in claim 4 wherein wiper means will be provided on each said shaft in a position to project above an upper edge of its adjacent said vane to clear strands therefrom.

10. An orienter as defined in claim 5 wherein wiper means will be provided on each said shaft in a position to project above an upper edge of its adjacent said vane to clear strands therefrom.

11. An orienter as defined in claim 1 wherein each of said disks is provided with notches circumferentially spaced around its periphery and extending radially inward by a selected distance and wherein a lower edge of said vane will extend slightly below a plane containing said parallel shafts a distance less than the radius of said disks.

12. An orienter as defined in claim 2 wherein each of said disks is provided with notches circumferentially spaced around its periphery and extending radially inward by a selected distance and wherein a lower edge of said vane will extend slightly below a plane containing said parallel shafts a distance less than the radius of said disks.

13. An orienter as defined in claim 3 wherein each of said disks is provided with notches circumferentially spaced around its periphery and extending radially inward by a selected distance and wherein a lower edge of said vane will extend slightly below a plane containing said parallel shafts a distance less than the radius of said disks.

14. An orienter as defined in claim 4 wherein each of said disks is provided with notches circumferentially spaced around its periphery and extending radially inward by a selected distance and wherein a lower edge of said vane will extend slightly below a plane containing said parallel shafts a distance less than the radius of said disks.

15. An orienter as defined in claim 5 wherein each of said disks is provided with notches circumferentially spaced around its periphery and extending radially inward by a selected distance and wherein a lower edge of said vane will extend slightly below a plane containing said parallel shafts a distance less than the radius of said disks.

16. An orienter as defined in claim 6 wherein each of said disks is provided with notches circumferentially spaced around its periphery and extending radially inward by a selected distance and wherein a lower edge of said vane will extend slightly below a plane containing said parallel shafts a distance less than the radius of said disks.

17. An orienter as defined in claim 7 wherein each of said disks is provided with notches circumferentially spaced around its periphery and extending radially inward by a selected distance and wherein a lower edge of said vane will extend slightly below a plane containing said parallel shafts a distance less than the radius of said disks.

18. An orienter as defined in claim 8 wherein each of said disks is provided with notches circumferentially spaced around its periphery and extending radially inward by a selected distance and wherein a lower edge of said vane will extend slightly below a plane containing said parallel shafts a distance less than the radius of said disks.

19. An orienter as defined in claim 1 wherein all said disks have essentially the same radius.

20. An orienter as defined in claim 1 wherein said adjacent disks forming said one wall of each passage are mounted on alternate shafts of said plurality of shafts and wherein disks on intermediate shafts positioned between said alternate shafts are mounted axially spaced midway between the disks on said alternate shafts.

* * * * *